(12) United States Patent  (10) Patent No.: US 12,204,477 B2
Lendi et al.  (45) Date of Patent: Jan. 21, 2025

(54) COMMUNICATION SYSTEM FOR ELEVATORS

(71) Applicant: CEDES AG, Landquart (CH)

(72) Inventors: Marcial Lendi, Naefels (CH); Oliver Nadig, Chur (CH)

(73) Assignee: Cedes AG, Landquart (CH)

( * ) Notice: Subject to any disclaimer, the term of this patent is extended or adjusted under 35 U.S.C. 154(b) by 73 days.

(21) Appl. No.: 18/067,986

(22) Filed: Dec. 19, 2022

(65) Prior Publication Data

US 2023/0205716 A1 Jun. 29, 2023

(30) Foreign Application Priority Data

Dec. 23, 2021 (EP) .................................. 21217351

(51) Int. Cl.
G06F 13/362 (2006.01)
(52) U.S. Cl.
CPC ................... G06F 13/362 (2013.01)
(58) Field of Classification Search
CPC .................................................. G06F 13/362
USPC ............................................................ 710/113
See application file for complete search history.

(56) References Cited

U.S. PATENT DOCUMENTS

| | | | | |
|---|---|---|---|---|
| 4,355,310 A * | 10/1982 | Belaigues | ............ | G01V 11/002 702/6 |
| 4,503,336 A * | 3/1985 | Hutchin | ................ | G10K 11/346 342/372 |
| 4,747,097 A * | 5/1988 | Ohya | ..................... | H04L 12/433 370/442 |
| 4,792,019 A * | 12/1988 | Bittar | .................... | B66B 1/2458 187/385 |
| 4,831,523 A * | 5/1989 | Lewis | ..................... | G06F 13/36 710/28 |
| 5,035,302 A * | 7/1991 | Thangavelu | .......... | B66B 1/2408 187/382 |
| 5,159,163 A * | 10/1992 | Bahjat | ..................... | B66B 1/468 187/384 |
| 5,168,135 A * | 12/1992 | Kubo | ........................ | B66B 3/00 187/382 |
| 5,183,981 A * | 2/1993 | Thangavelu | .......... | B66B 1/2408 187/383 |
| 5,317,114 A * | 5/1994 | Pullela | ..................... | B66B 1/20 187/398 |
| 5,387,769 A * | 2/1995 | Kupersmith | .......... | B66B 1/3415 370/461 |

(Continued)

FOREIGN PATENT DOCUMENTS

CN 1198754 C 4/2005

OTHER PUBLICATIONS

Search Report for European Patent Application No. 21217351.2 dated Jun. 27, 2022, 7 pages.

*Primary Examiner* — Paul R. Myers
(74) *Attorney, Agent, or Firm* — Christopher J. Volkmann; Kelly, Holt & Christenson, PLLC.

(57) ABSTRACT

The communication system according to one embodiment for an elevator comprises a bus controller and a plurality of bus nodes. The bus controller periodically sends requests to all bus nodes and receives the responses from the bus nodes. The bus nodes receive requests from the bus controller and send responses to the bus nodes. The bus controller is designed to select a group of bus nodes for each of its requests and to wait for the responses of these bus nodes between two requests.

10 Claims, 2 Drawing Sheets

(56) References Cited

U.S. PATENT DOCUMENTS

| | | | | |
|---|---|---|---|---|
| 5,508,612 A | * | 4/1996 | Kanazawa | G01R 33/5615 |
| | | | | 324/309 |
| 5,675,830 A | * | 10/1997 | Satula | G05B 19/0423 |
| | | | | 711/E12.089 |
| 10,554,443 B2 | | 2/2020 | Sonnenmoser et al. | |
| 2002/0087767 A1 | * | 7/2002 | Hwang | G06F 13/362 |
| | | | | 710/111 |
| 2005/0066056 A1 | * | 3/2005 | Dominic | H04L 69/161 |
| | | | | 709/201 |
| 2006/0126591 A1 | * | 6/2006 | Bysted | H04L 1/0061 |
| | | | | 370/535 |
| 2012/0017013 A1 | * | 1/2012 | Sandhu | G16Z 99/00 |
| | | | | 710/61 |
| 2012/0305339 A1 | * | 12/2012 | Korhonen | G07C 9/27 |
| | | | | 187/380 |
| 2015/0053507 A1 | * | 2/2015 | Kattainen | B66B 5/00 |
| | | | | 187/288 |
| 2018/0046926 A1 | * | 2/2018 | Achin | G06F 9/5011 |
| 2021/0365935 A1 | * | 11/2021 | Tripathy | G06F 11/079 |

* cited by examiner

COMMUNICATION SYSTEM FOR ELEVATORS

CROSS-REFERENCES TO RELATED APPLICATION

This application claims the benefit of European Application No. 21217351.2, filed Dec. 23, 2021.

BACKGROUND

The present disclosure relates to a communication system for elevators.

Communication systems for elevators known in the prior art are either technically very complex or too slow for a number of specific functions in the elevator.

DETAILED DESCRIPTION

Figure 1:
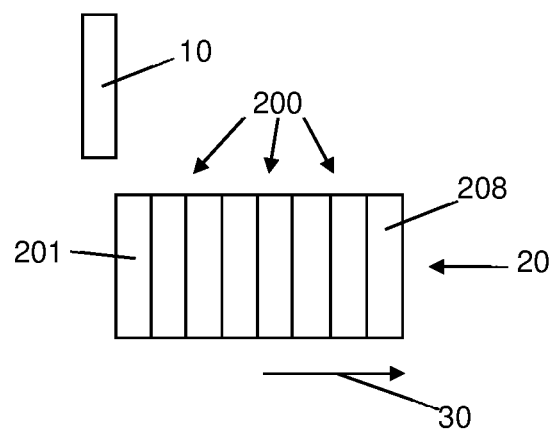
FIG. 1 shows bus communication with request and responses, in one example.

An object of the present disclosure is to provide an improved communication system.

This object is achieved, based on a communications system of the above-mentioned type by means of a communication system according to claim 1, an elevator according to claim 7 and a bus controller according to claim 8. Advantageous configurations are specified in the other dependent claims.

The communication system according to one embodiment for an elevator comprises a bus controller and a plurality of bus nodes. The bus controller periodically sends requests to all bus nodes and receives the responses from the bus nodes. The bus nodes receive requests from the bus controller and send responses to the bus node. The bus controller is designed to select a group of bus nodes for each of its requests and to wait for the responses of these bus nodes between two requests.

A group is a portion of the bus nodes, so that at least one further group of bus nodes exists.

This can provide the advantage that the frequency of the responses is increased.

The bus controller can be a separate device from the elevator control system, with or without its own housing. The bus controller can be integrated into the elevator control system.

Preferably, in one example, the bus controller is designed to select different group of bus nodes when making its requests until all bus nodes have been selected once or at least once and to carry out this procedure repeatedly.

This can provide the advantage that different types of groups can be treated differently. This increases the flexibility of the system. This can also provide the advantage that the system is adaptable to the different levels of urgency.

Preferably, in one example, the bus controller is designed to select different groups of bus nodes in time intervals of different lengths. In particular, the bus node selects at least one specific group in a different time interval than other groups. In particular, the at least one different time interval is an integer multiple of the shortest time interval. In particular, at least one specific group of bus nodes is selected in time intervals that are half as long as other groups of bus nodes.

This can provide the advantage that the system is adaptable to the different levels of urgency. This can provide the advantage that the polling frequency for at least one group can be increased without having to change the capability of the hardware. This can provide the advantage that all groups respond within a repetition interval in a minimum amount of time.

Preferably, in one example, the bus nodes are designed such that the different groups of bus nodes correspond to different types of groups of bus nodes and/or that different types of groups of bus nodes correspond to different types of sensors from the sensors associated with the bus nodes, and/or that the different types of groups of bus nodes correspond to different types of safety classes or urgency classes of the sensors associated with the bus nodes.

Types of sensors can be: cabin door sensors, shaft door sensors, cabin position sensors, emergency stop switches, operating mode switches, inspection run switches, service door sensors, motor status sensor, brake status sensors.

A different safety class or urgency class means that the sensors and their relevant bus nodes must be polled and responded to more or less frequently. A higher safety class or urgency class of sensors and assigned bus nodes is more time-critical and must be queried more often and must transmit the data more often than a lower safety class or urgency class of sensors and bus nodes.

The sensor with the highest safety class or urgency class connected to a bus node defines the safety class or urgency class of the bus node. In general, sensors of the same safety class or urgency class are connected to one bus node.

The cabin door sensors and shaft door sensors correspond to a lower safety class or urgency class than the other sensors. These door sensors are typically less time-critical. Therefore, the door sensors are polled less often than the other sensors. The polling period of the door sensors is longer than the polling period of the other sensors. The polling period of the other sensors is shorter than the polling period of the door sensors. There is a considerably higher number of door sensors than the other sensors. Therefore, the other sensors can be polled at shorter intervals than if all sensors were to be polled at equal intervals.

This can provide the advantage that the groups of bus nodes with safety sensors or more critical sensors can be polled more frequently than groups of bus nodes with sensors that are not safety sensors or critical sensors.

Preferably, in one example, the bus nodes are designed to send a message to the bus controller in response to the bus controller request only if the bus node is included in the group of selected bus nodes.

This can provide the advantage that the communication is organized and proceeds with minimal effort.

Preferably, in one example, the bus nodes are designed to send a message to the bus controller in response to the bus controller request only if the bus node is included in the group of selected bus nodes and, after the request, to send its responses to the bus controller to the bus nodes also included in the group of the selected bus nodes in a specific order.

This can provide the advantage that the communication is organized and proceeds with minimal effort.

The elevator according to one embodiment is an elevator with a communication system described above.

The bus controller according to one embodiment is a bus controller according to the communication system described above.

Further features of the present disclosure are specified in the drawings.

The specified advantages in each case can also be implemented for feature combinations in the context of which they are not mentioned.

Exemplary embodiments of the invention are shown in the drawings and will be explained in more detail in the following. Identical reference numerals in the individual figures designate corresponding elements.

FIG. 1 shows a timing diagram of the bus communication with the request of the bus controller and the responses of a group of bus nodes.

The bus consists of a bus controller that is connected to bus nodes via a bus connection. The bus nodes are each connected to a plurality of sensors, receive their sensor data and can forward this sensor data to the bus controller via the bus connection. The bus controller is connected to the elevator control system and can forward the sensor data to the elevator control system.

There are 50 bus nodes distributed within the elevator. The bus nodes have different addresses. Each bus node is connected to 8 sensors.

10 bus nodes are located on the cabin, in the pit and/or near the elevator control system where they are connected to their associated sensors. The data of these 80 sensors is at least partly particularly safety-relevant or particularly urgent and is particularly important to evaluate. These 10 bus nodes are therefore higher-priority bus nodes. These bus nodes form a group of consecutive addresses.

40 bus nodes are arranged in the elevator shaft, where they are primarily connected to door sensors. The data from these 320 sensors is less safety-relevant or urgent and therefore only needs to be sent to the elevator control system less often. These 40 bus nodes are therefore lower-priority bus nodes. The 40 bus nodes form 4 groups of 10 bus nodes, each with consecutive addresses.

The bus controller sends requests 10 to all bus nodes via the bus connection and in doing so, notifies the addresses of a specific group, i.e. it addresses a specific group. The bus nodes recognize whether they belong to the group of notified addresses of this request. Only the bus nodes of the affected group send a response 20 with the sensor data of the sensors connected to them, immediately after the request. In this case, the bus nodes of the associated group send their responses 200 to the bus controller via the bus connection consecutively in the order of their addresses 201, . . . 209 in the time period 30. The bus controller can identify the bus nodes by means of the sequence of responses in case they do not include their address in the transmission, and thus assign the sensor data.

This procedure does not require a request for every bus node and speeds up the method by not sending unnecessary requests.

Figure 2:
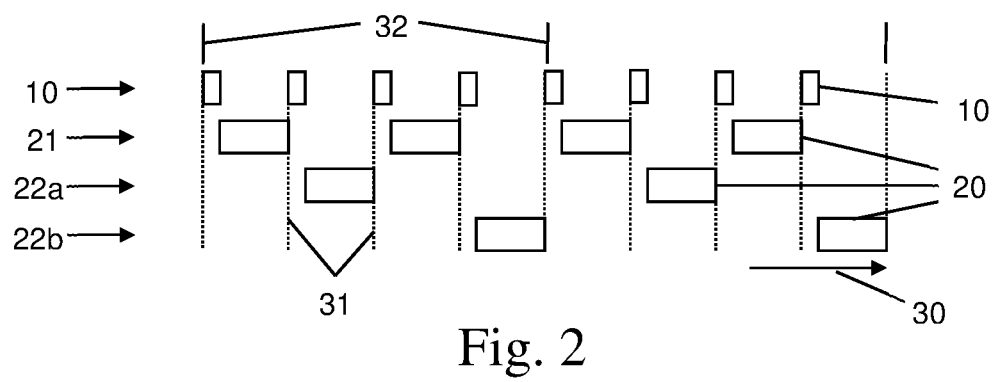
FIG. 2 shows bus communication with 3 groups of bus nodes, in one example.

FIG. 2 shows a timing diagram of the bus communication according to FIG. 1 with 3 groups of bus nodes.

Within the time period 30, the bus controller sends the requests 10 periodically with the time interval of the request intervals 31.

The bus controller thus addresses a group of higher-priority bus nodes 21 with its requests at every 2nd polling interval. The bus nodes of this higher-priority group send their responses 21 immediately after the request within the polling interval. The responses of these priority bus nodes 21 are thus sent with a time interval of a period of two polling intervals.

In the intervening polling intervals, the bus controller alternately addresses a second and a third group of lower-priority bus nodes in its requests. They each send their responses immediately after the request relating to them within the polling interval, so that the responses of these two lower-priority groups 22a, 22b are sent alternately and in each case with a time interval of four polling intervals.

Two repetition intervals 32 are shown in the figure. In one repetition interval, all groups of bus nodes, i.e. all bus nodes and thus all sensors, are polled at least once.

Thus, the embodiment according to FIG. 2 shows a group of higher-priority bus nodes and 2 groups of lower-priority bus nodes. The higher-priority bus nodes are polled twice as often and supply the sensor data of their assigned sensors to the bus controller and thus to the elevator control system twice as often as the lower-priority bus nodes.

The lower polling frequency of the lower-priority bus nodes accelerates the possible polling frequency of the higher-priority bus nodes compared to an identical polling frequency for all bus nodes.

Figure 3:
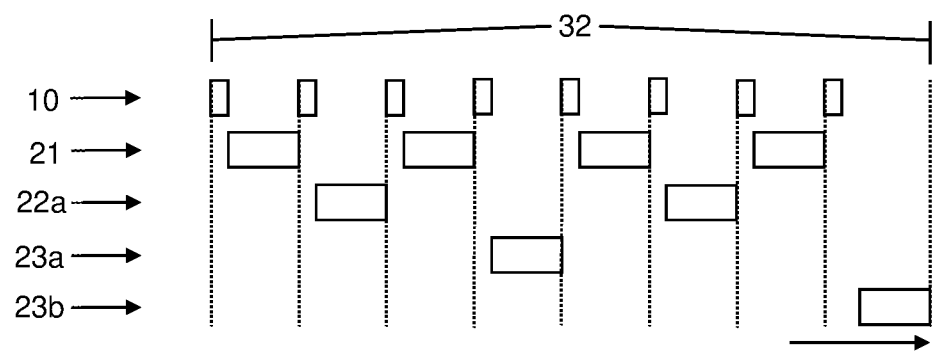
FIG. 3 shows bus communication with 4 groups of bus nodes, in one example.

FIG. 3 shows a timing diagram of the bus communication according to FIG. 1 with 4 groups of bus nodes.

A repetition interval 32 is shown. Over the time period, the bus controller sends the requests 10 periodically with the time interval of the request intervals 31.

The bus controller thus addresses a group of higher-priority bus nodes 21 with its requests at every 2nd polling interval. The bus nodes of this higher-priority group send their responses 21 immediately after the request within the polling interval. The responses of these priority bus nodes 21 are thus sent with a time interval equal to a period of two polling intervals.

In the intervening polling intervals, the bus controller alternately addresses a second, third and fourth group of bus nodes in its requests.

The bus nodes of the second group 22a are addressed by the bus controller in its requests at intervals that are twice as long as the addressing of the bus nodes of the higher-priority group, i.e. in every 4th polling interval. They each send their responses immediately after the request relating to them within the polling interval, so that the responses of this group 22a are each sent with a time interval equal to a period of four polling intervals.

In the remaining free polling intervals, the bus controller addresses the third and fourth groups 23a, 23b of bus nodes alternately with its requests and thus in every 8th polling interval. They each send their responses immediately after the request relating to them within the polling interval, so that the responses of these two lower-priority groups 23a, 23b are sent alternately and in each case with an interval equal to eight polling intervals.

Thus, the embodiment according to FIG. 3 shows one group of high-priority bus nodes, a group of lower-priority bus nodes, and two groups of particularly low-priority bus nodes.

The lower polling frequency of the lower-priority bus nodes accelerates the possible polling frequency of the higher-priority bus nodes compared to an identical polling frequency for all bus nodes.

In addition, this embodiment enables the different polling frequency of 3 bus node types with different levels of urgency, i.e. of 3 sensor types of different urgency.

Figure 4:
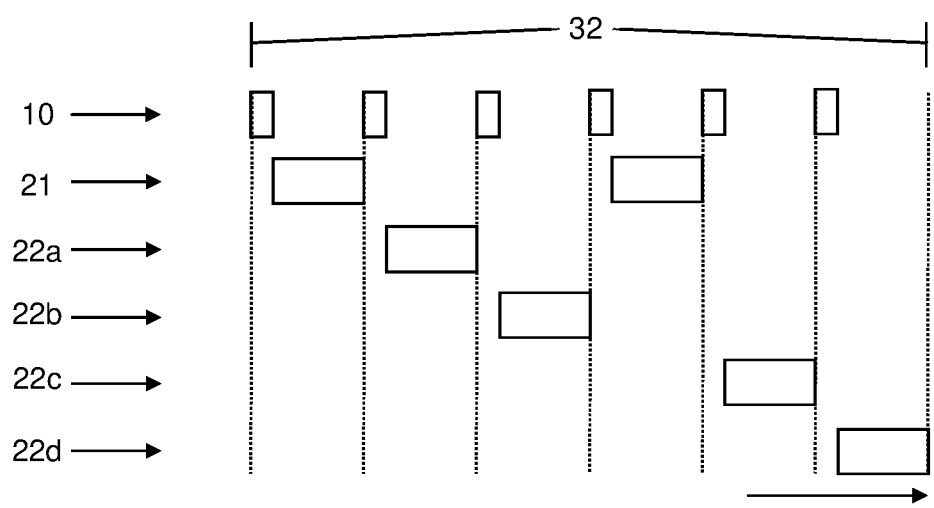
FIG. 4 shows bus communication with 5 groups of bus nodes, in one example.

FIG. 4 shows a timing diagram of the bus communication according to FIG. 1 with 5 groups of bus nodes.

A repetition interval 32 is shown. Over the time period 30, the bus controller sends the requests 10 periodically with the time interval of the request intervals.

The bus controller thus addresses a group of higher-priority bus nodes 21 with its requests at every 3rd polling interval. The bus nodes of this higher-priority group send their responses 21 immediately after the request within the polling interval. The responses 21 of these higher-priority bus nodes are thus sent with a time interval equal to a period of three polling intervals.

In the intervening polling intervals, the bus controller addresses a second, third, fourth, and fifth group of lower-priority bus nodes with its requests. These groups of bus nodes are addressed sequentially. Thus, the responses of each of these groups 22a, 22b, 22c, 22d are carried out at a time interval of a period of six polling intervals.

Thus, the embodiment according to FIG. 4 shows a group of high-priority bus nodes and four groups of lower-priority bus nodes. The higher-priority bus nodes send the data of their assigned sensors twice as often as the lower-priority bus nodes.

The group of higher-priority bus nodes consists of 10 bus nodes which are arranged on the cabin, in the pit and/or near the elevator control system. Eight sensors are assigned to each of these high-priority bus nodes. These 80 sensors in total can be particularly safety-relevant sensors.

The 4 groups of lower-priority bus nodes each consist of 10 bus nodes. These 40 bus nodes in total are arranged in the elevator shaft. Eight sensors are assigned to each of these 40 high-priority bus nodes. These 320 sensors in total are generally door sensors or other sensors in the elevator that are less safety-relevant.

Using this design makes it possible to take advantage of the special feature of the elevator system that the elevator has different sensors with different requirements on the urgency of their sensor data.

Although the present invention has been described with reference to preferred embodiments, workers skilled in the art will recognize that changes may be made in form and detail without departing from the spirit and scope of the invention.

LIST OF REFERENCE SIGNS 10 request
20 responses from a group of bus nodes
21 responses from a first and higher-ranked group
22a responses from a 2nd and lower-ranked group of 2nd priority
22a responses from a 3rd and lower-ranked group of 2nd priority
22a responses from a 4th and lower-ranked group of 2nd priority
22a responses from a 5th and lower-ranked group of 2nd priority
23a responses from a 3rd and lower-ranked group of 3rd priority
22a responses from a 4th and lower-ranked group of 3rd priority
200 responses of the individual bus nodes in a group
201 response of the first bus node in a group
208 response of the last bus node in a group
30 time axis
31 request interval
32 repetition interval

The invention claimed is:

1. A communication system for an elevator, the communication system comprising:
a bus controller; and
a plurality of bus nodes, wherein each bus node, of the plurality of bus nodes, is connected to one or more elevator sensors of the elevator and configured to forward sensor data from the one or more elevator sensors to the bus controller,
wherein the bus controller is configured to:
periodically send requests to the plurality of bus nodes and to receive responses from the plurality of bus nodes, wherein the bus controller is configured to:
select a first group of bus nodes for a first request of the plurality of requests,
select a second group of bus nodes for a second request of the plurality of requests, and
wait to send the second request to the second group of bus nodes until a response to the first request has been received by the bus controller.

2. The communication system for an elevator according to claim 1, wherein the bus controller is configured to select a different group of bus nodes for subsequent requests until all bus nodes, of the plurality of bus nodes have been selected at least once.

3. The communication system for an elevator according to claim 2, wherein
the bus controller is configured to select different groups of bus nodes in time intervals of different lengths,
at least one specific group of bus nodes is selected in a different time interval than at least one other group,
the different time intervals are an integer multiple of a shortest time interval of the time intervals, and
at least one specific group of bus nodes is selected in time intervals that are half as long as time intervals for other groups of bus nodes.

4. The communication system for an elevator according to claim 3, wherein the bus nodes are configured such that
the different groups of bus nodes correspond to different types of groups of bus nodes, and/or
the different types of groups of bus nodes correspond to different types of sensors from the sensors associated with the bus nodes, and/or
the different types of groups of bus nodes correspond to different types of safety classes or urgency classes of the sensors associated with the bus nodes.

5. The communication system for an elevator according to claim 1, wherein each respective bus node, in the first group of bus nodes, is configured to send a message to the bus controller in response to the first request only if the respective bus node is included in the first group.

6. The communication system for an elevator according to claim 5, wherein each respective bus node, in the first group of bus nodes are designed-is configured to:
after receiving the first request, send the response to the other bus nodes also included in the first group.

7. The communication system for an elevator according to claim 6, wherein each respective bus node, in the first group of bus nodes is configured to:
send the response to the other bus nodes also included in the first group in a specific order.

8. The communication system according to claim 1, wherein the second group of bus nodes is different than the first group of bus nodes.

9. An elevator having a communication system comprising:
   a plurality of bus nodes; and
   a bus controller configured to:
      periodically send requests to the plurality of bus nodes and to receive responses from the plurality of bus nodes, wherein the bus controller is configured to:
         select a first group of bus nodes for a first request of the plurality of requests,
         select a second group of bus nodes for a second request of the plurality of requests, and
         wait to send the second request to the second group of bus nodes until a response to the first request has been received by the bus controller.

10. A method performed by a bus controller in an elevator communication system, the method comprising:
   periodically sending requests to the plurality of bus nodes and to receive responses from the plurality of bus nodes;
   selecting a first group of bus nodes for a first request of the plurality of requests;
   selecting a second group of bus nodes for a second request of the plurality of requests; and
   waiting to send the second request to the second group of bus nodes until a response to the first request has been received by the bus controller.

* * * * *